Dec. 12, 1939.  B. LIEBOWITZ  2,183,242
COLLAR AND METHOD OF MAKING THE SAME
Filed Dec. 24, 1937
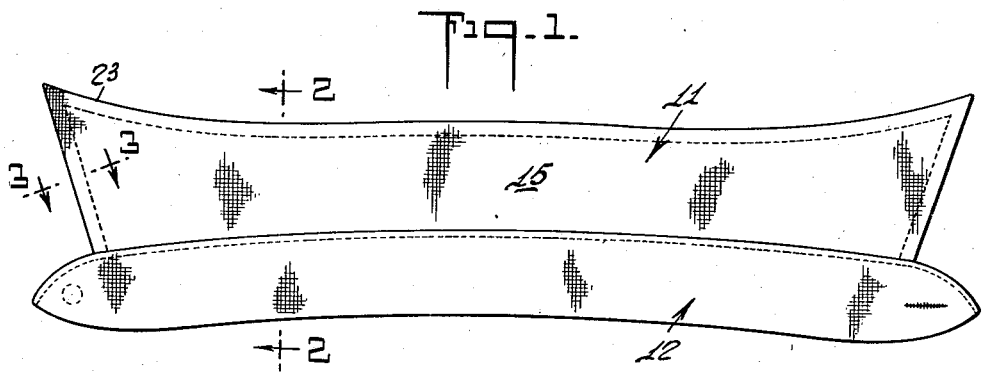
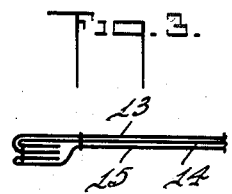
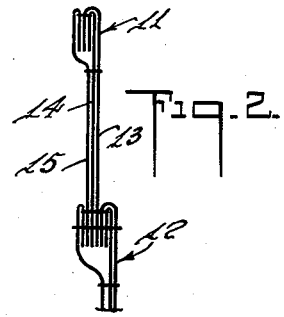
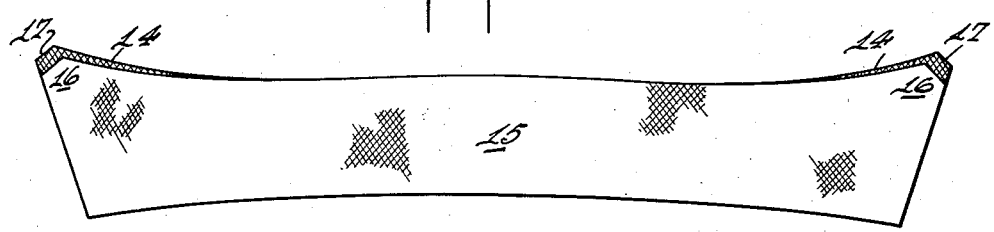
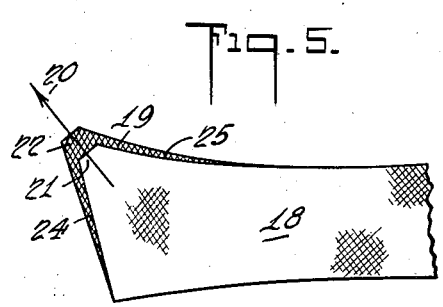
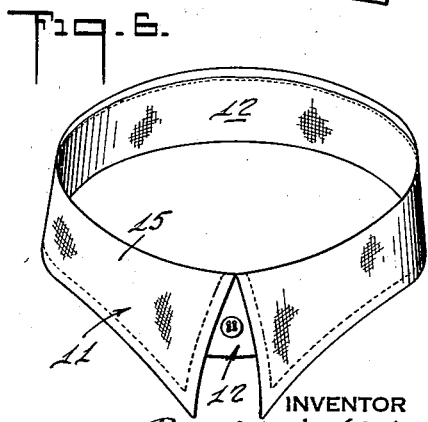
INVENTOR
Benjamin Liebowitz.
BY
ATTORNEY Patented Dec. 12, 1939

2,183,242

UNITED STATES PATENT OFFICE 2,183,242

COLLAR AND METHOD OF MAKING THE SAME

Benjamin Liebowitz, New York, N. Y., assignor to Trubenizing Process Corporation, New York, N. Y., a corporation of New York Application December 24, 1937, Serial No. 181,622

7 Claims. (Cl. 2—143)

This invention relates to a collar or similar article of apparel, and the method of making the same.

It is well known that ordinary soft or semi-stiff collars often have a tendency to curl outward at the points when worn. The principal object of my invention is to create forces in the collar which will oppose this curling tendency when it occurs. A further object of my invention is to achieve this result at a minimum of expense and in a simple and effective manner.

I accomplish this result by making up the collar in the usual way but so selecting, cutting and treating the materials for the different layers of the collar that differential shrinkage effects result when the collar becomes moist or when it is washed; these differential shrinkage effects are so arranged as to make the points of the collar curl inwardly, and thereby oppose the outward curling tendency of the points when worn. The differential shrinkage effects here referred to may extend throughout the entire collar, or may be localized in the neighborhood of the points, as will be hereinafter explained.

In ordinary soft collars, such differential shrinkage effects cannot be usefully employed to create the desired forces because if the collar is soft the shrinkage of the collar, or of any part thereof, will be determined by the layer or layers or parts thereof which have the maximum shrinkage, and the layer or layers which have less than the maximum shrinkage will simply tend to pucker, either in visible or in invisible puckers. In order to bring about the desired curling effects, it is essential that the collar shall have some compressive resistance in its own plane, at least in those directions in which tensile forces arise due to the differential shrinkage.

Collars which are composed of a plurality of plies adhesively united are especially well adapted for this purpose, because as a result of the adhesive union of the plies, a certain amount of ability to resist compression in the plane of the collar arises. My invention is therefore particularly applicable to such "fused" collars. It is to be understood, however, that the invention is not restricted to such collars. A collar which is starched to a corresponding degree of stiffness as such fused collars, may also enjoy the benefits of my invention, provided, however, that in the laundering of the collar certain precautions are observed which will be explained later.

My invention is illustrated in the accompanying drawing, in which:

Figure 1 is a plan view of a fold-over collar laid out flat;

Fig. 2 is a diagrammatic cross-sectional view on the line 2—2 of Figure 1;

Fig. 3 is a diagrammatic cross-sectional view on the line 3—3 of Figure 1;

Fig. 4 is a plan view of cut plies superimposed;

Fig. 5 is a fragmentary plan view illustrating a modification; and

Fig. 6 is a perspective view of a fold-over collar showing the inwardly curled points.

It will be understood that the collars may be either of the detached or attached types. Referring to the drawing, the collar shown in Figure 1 comprises a collar top portion 11 and a collar band portion 12. The collar may be made according to any of the usual or conventional methods. In Fig. 2 I have shown a three-ply collar top consisting of an outside or face ply 13, a lining ply 14, and a back ply 15. It is customary to make the band portion likewise of three plies. In this invention I achieve the desired results entirely by the proper selection of materials for the back ply or by properly cutting and treating the said back ply 15.

Referring to Fig. 4, I have shown a lining ply 14 and a back ply 15 superimposed on one another. It will be observed that the bottom ply 15 is so cut that its ends 16 are shorter than the corresponding ends 17 of the lining ply 14. It will be understood that the top ply 13 is cut in the same shape as the lining ply 14. In practice I make the difference in the lengths of the points or ends of the bottom ply and the lining ply from about 3% to 7% of the length of said points or ends. The results which I obtain depend on differential shrinkage characteristics as mentioned, and I will describe my invention in connection with the use of fabrics which have been commercially pre-shrunk so as to have very small or zero shrinkage. It will be understood, however, that the absolute shrinkage characteristics of the fabrics are not the determining factor but only the relative shrinkage characteristics of the fabric.

Before stitching together the plies of the collar, I take the bottom ply 15, cut substantially in the form shown in Fig. 4, then moisten its ends thoroughly, and subject it to a stretching operation so as to draw out the points or ends 18 of the bottom ply 15 practically coextensive and conterminous with the points or ends 17 of the lining ply 14. This stretching operation can be readily performed in a suitable mechanical device which will grip the appropriate parts of the ply 15, subject them to the necessary stretching forces, and then dry them in this stretched state, as by means of a pressing iron comprising part of the device.

In this way, I induce in the bottom ply 15 an increased shrinkage in the neighborhood of the ends, as compared with the shrinkage of the lining ply 14 or the top ply 13 in the same region. In order to obtain a maximum effect from this differential shrinkage, I prefer to cut the bottom ply 15 with its length perpendicular to the warp of the fabric rather than parallel to the warp of the fabric.

When the bottom ply 15 has been stretched, the plies 13, 14, and 15 are assembled, stitched, and turned in the usual manner. It will be noted that in Fig. 4 the points are somewhat truncated but that when they are turned, they form points in the finished collar top as seen in Figure 1.

Tensile forces will be set up in the finished collar top as soon as it is wetted or moistened either by washing or by insensible perspiration, or even by the humidity of the atmosphere when that humidity runs high. These tensile forces, co-acting with compressive resistance mentioned above, tend to make the points of the finished collar top curl inwardly.

I can further emphasize this curling tendency by a modified method of cutting and stretching of the ends of the collar. I have indicated this in a fragmentary view in Fig. 5. Here 18 represents the bottom ply, and 19 the lining ply which latter is cut the same shape and size as the face ply. The arrow 20 in Fig. 5 indicates the general direction of stretch of the end portions 21 of the bottom ply 18. In this embodiment I not only make the ends or points 21 shorter than the corresponding end portions 22 of the lining ply 19, but I also change the angle at which the points or ends 21 are cut, and then, by the wetting and stretching operation, I draw out the ends of the bottom ply 18 to conform to the shape of and become substantially conterminous with the ends 22 of the lining ply 19. In this way I induce differential shrinkage not only along the ends of the collar but also along the edge 23 (see Figure 1) of the collar top in the region of the ends, and thereby enhance the inward curling tendency. In employing the embodiment shown in Fig. 5, the ply 18 may be cut lengthwise of the warp or perpendicular to the warp, as desired. The desired stretching of the end portions of the bottom ply may be effected by a suitable stretching device having clamps that will engage the material at the points 21 and at an interval along each edge 24 and 25, and will draw out the material in the direction of the arrow 20 to the desired extent.

Instead of cutting the bottom ply with its points shorter than those of the lining and face plies, I may in some instances cut the points of the three plies all of the same size and shape. In this case I employ for the bottom ply a textile material which has a lengthwise shrinkage that is greater than the widthwise shrinkage of the other two plies by about 3% to 7%. I cut the bottom ply at right angles to the warp, while the lining and face plies are cut parallel to the warp. When my invention is carried out in this manner, the differential shrinkage extends throughout the entire collar top and will cause the entire collar top to "bow" or curl inwardly. On this account, this modification is less desirable, but nevertheless it has certain advantages and may be used in practice.

Should the tendency of the points to curl inwardly be substantially diminished by reason of repeated launderings, such tendency can be restored by stretching the points after washing while the collar is wet and before it is ironed. If my invention is applied to a non-fused starched collar, then after each laundering, the points should be stretched after the starch has been applied when the collar is still wet.

It will be observed that I have introduced the desired differential shrinkage without adding any extra layers of material. This is desirable because extra layers of material tend to thicken the edges, and such thickened edges are in some instances undesirable.

By the term "stiffened collar top" as used in the claims is meant a collar top that is stiffened either by adhesion of the plies, by use of starch, or in any other suitable manner. In using the term "points" in the claims, it is to be understood that they need not necessarily be sharp points but that the points or ends of the collar top may be rounded or otherwise shaped.

What I claim is:

1. In a process of making a multi-ply collar top having points that tend to curl inwardly, the steps which consist in cutting the points of that ply which constitutes the bottom ply of the finished collar top of a smaller area in the neighborhood of the points than the corresponding area of the other plies, wetting said bottom ply, stretching the material of said area of the bottom ply to conform to the corresponding area of the other plies, drying said bottom ply in this stretched condition, and then securing it to the other plies.

2. In a process of making a multi-ply collar top having points that tend to curl inwardly, the steps which consist in cutting the points of that ply which constitutes the bottom ply of the finished collar top of smaller size than the points of the other plies, stretching the points of said bottom ply to conform substantially to the shape and size of the points of the other plies, and then securing the bottom ply to the other plies in this stretched condition.

3. In a collar of the fold-over type having a stiffened collar top formed with points and composed of a plurality of fabric plies secured together, all plies above the bottom ply having little or no shrinkage, the bottom ply having a greater transverse shrinkage factor in the neighborhood of the points than the other plies whereby a tendency to curl the points inwardly is created.

4. A process of making a collar of the fold over type having a stiffened collar top formed with points and composed of a plurality of fabric plies, comprising the steps of cutting the bottom ply shorter in the neighborhood of the points than the other plies, stretching the bottom ply to conform to the size and shape of the other plies before the plies are secured together, and then securing the plies together.

5. A process of inducing a differential shrinkage between the plies of a multi-ply collar of the fold over type having a stiffened collar top formed with points, comprising the steps of cutting the bottom ply shorter than the other plies in the neighborhood of the points thereof, stretching and setting the bottom ply to conform to the shape and size of the other plies, and then securing the plies together.

6. A process of inducing a differential shrinkage between the plies of a multi-ply collar of the fold over type having a stiffened collar top formed with points which comprises cutting all plies from a fabric having greater shrinkage in the direction of its warp than its weft, cutting the bottom ply along the direction of the weft of the fabric, cutting all other plies along the direction of the warp of the fabric and then securing the plies together.

7. A process of inducing a differential shrinkage between the plies of a multi-ply collar of the fold over type having a stiffened collar top formed with points which comprises cutting all plies from a fabric having a greater shrinkage in one direction of its weave than in the direction at right angles thereto, cutting all plies except the bottom ply along the direction of greater shrinkage of the fabric, cutting the bottom ply at right angles to the direction of greater shrinkage of the fabric and then securing the plies together.

BENJAMIN LIEBOWITZ.